(12) United States Patent
Kikuchi et al.

(10) Patent No.: US 9,061,212 B2
(45) Date of Patent: Jun. 23, 2015

(54) GAME DEVICE, GAME CONTROL METHOD AND GAME CONTROL PROGRAM FOR CONTROLLING A GOLF GAME

(75) Inventors: Takanori Kikuchi, Saitama (JP); Hisashi Kishida, Saitama (JP); Masashi Muramori, Kanagawa (JP); Toshiyuki Kuwabara, Kanagawa (JP); Hirofumi Hashimoto, Kanagawa (JP); Yoshinori Kotsugai, Tokyo (JP); Kentaro Suzuki, Tokyo (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 89 days.

(21) Appl. No.: 13/540,815

(22) Filed: Jul. 3, 2012

(65) Prior Publication Data
US 2013/0017871 A1 Jan. 17, 2013

(30) Foreign Application Priority Data

Jul. 13, 2011 (JP) .................................. 2011-154992

(51) Int. Cl.
| | |
|---|---|
| A63F 13/211 | (2014.01) |
| A63F 13/812 | (2014.01) |
| A63F 13/428 | (2014.01) |
| A63F 13/21 | (2014.01) |
| A63F 13/816 | (2014.01) |
| A63F 13/00 | (2014.01) |

(52) U.S. Cl.
CPC .............. *A63F 13/428* (2014.09); *A63F 13/21* (2014.09); *A63F 13/816* (2014.09); *A63F 13/00* (2013.01); *A63F 2300/105* (2013.01); *A63F 2300/1087* (2013.01); *A63F 2300/1093* (2013.01); *A63F 2300/6045* (2013.01); *A63F 2300/646* (2013.01)

(58) Field of Classification Search
USPC ...................................... 463/36–37
See application file for complete search history.

(56) References Cited

U.S. PATENT DOCUMENTS

| 4,711,543 | A | 12/1987 | Blair et al. | |
|---|---|---|---|---|
| 8,033,914 | B2 * | 10/2011 | Yoshikawa et al. | ............. 463/36 |

(Continued)

FOREIGN PATENT DOCUMENTS

| EP | 2 012 891 | 1/2009 |
|---|---|---|
| EP | 2 236 179 | 10/2010 |

(Continued)

OTHER PUBLICATIONS

European Search Report dated Nov. 23, 2012, from corresponding European Application No. 12005090.1.

(Continued)

*Primary Examiner* — Bach Hoang
(74) *Attorney, Agent, or Firm* — Katten Muchin Rosenman LLP (57) ABSTRACT

A game device includes an input receiving unit for receiving the input of user's operations, a control unit for controlling a game where a player's character plays golf, according to the input of the user's operation, and a screen generating unit for displaying a game screen. The control unit includes an impact determining unit for acquiring the position of an input device at the start of a shot and the position of the input device at the time of an impact, when the user swings the input device while holding it and then comparing the respective positions with each other so as to determine the impact position, and a ball path calculating unit for calculating the path of a ball hit in the impact.

17 Claims, 10 Drawing Sheets

(56) References Cited

U.S. PATENT DOCUMENTS

| | | | |
|---|---|---|---|
| 8,403,749 B2* | 3/2013 | Yoshikawa et al. | 463/31 |
| 8,696,453 B2* | 4/2014 | Yoshikawa et al. | 463/31 |
| 2006/0128468 A1* | 6/2006 | Yoshikawa et al. | 463/36 |
| 2008/0096657 A1* | 4/2008 | Benoist | 463/36 |
| 2008/0113798 A1 | 5/2008 | Miyanaga et al. | |
| 2009/0170579 A1 | 7/2009 | Ishii et al. | |
| 2010/0248824 A1* | 9/2010 | Suzuki et al. | 463/30 |
| 2010/0248834 A1* | 9/2010 | Suzuki et al. | 463/36 |
| 2010/0248835 A1* | 9/2010 | Suzuki et al. | 463/36 |
| 2010/0248836 A1* | 9/2010 | Suzuki et al. | 463/36 |
| 2010/0248837 A1* | 9/2010 | Suzuki et al. | 463/36 |
| 2010/0323783 A1 | 12/2010 | Nonaka et al. | |

FOREIGN PATENT DOCUMENTS

| | | |
|---|---|---|
| EP | 2 460 569 | 6/2012 |
| JP | 2000-202164 | 7/2000 |
| JP | 2009-247763 | 10/2009 |
| JP | 2010-246612 | 11/2010 |
| WO | 2007/130872 | 11/2007 |
| WO | 2008/011515 | 1/2008 |

OTHER PUBLICATIONS

Notification of Reason(s) for Refusal dated May 28, 2013, from corresponding Japanese Application No. 2011-154992.

Shogakukan Inc., "Mario Golf 64" Aug. 10, 1999, 1st ed. p. 4.

* cited by examiner

GAME DEVICE, GAME CONTROL METHOD AND GAME CONTROL PROGRAM FOR CONTROLLING A GOLF GAME

BACKGROUND OF THE INVENTION

1. Field of the Invention

The present invention relates to a game control technology, and in particular to a game device, a game control method, and a game control program for controlling a sport-related game such as a golf game.

2. Description of the Related Art

Games in which golf is played by operating a character enjoys high popularity today. The golf is a world-wide popular sport, having a great number of players in the actual world, spread over a wide age group.

A number of golf games are available on the market. Since a style of golf playing is simple in nature, the golf game is not very distinctive from other games and therefore most of those available on the market are not very challenging as they should be. Thus, the development of a golf game capable of giving a fresh excitement is desired. A user interface used when a ball is shot is a vital factor in determining the performance or scores gained through the golf game. Hence, desired in particular is the development of the user interface that is not only easy to use by a user but also capable of hitting various shots as the user exactly expects, namely, the user interface by which the input of a user's operation can be accurately reflected in the shots.

SUMMARY OF THE INVENTION

The present invention has been made in view of the foregoing circumstance, and a purpose thereof is to provide a game control technology that enhances the quality of entertainment.

One embodiment of the present invention relates to a game control program. The game control program is a program embedded in a non-transitory computer-readable medium and the program includes: an input receiving module operative to receive an input of a user's operation; a control module operative to control a game where a player's character plays golf, according to the input of the user's operation; and a screen generating module operative to display a screen of the game, wherein the control module includes: an impact determining module operative to acquire a position of an input device at the start of a shot and the position of the input device at the time of an impact, when a user swings the input device while holding the input device, and operative to compare the respective positions with each other so as to determine an impact position; and a ball path calculating module operative to calculate the path of a ball hit in the impact position determined by the impact determining module.

Optional combinations of the aforementioned constituting elements, and implementations of the invention in the form of methods, apparatuses, systems, and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

A game device according to an embodiment of the present invention provides a golf game. In the present embodiment, an input device held by a user is regarded as a golf club, and the user strikes a shot by actually swinging the input device. The game device according to the present embodiment is provided with an image pickup apparatus for picking up images of the input device. This image pickup apparatus takes an image of the input device when the user strikes a shot. A reference position before the shot and the position of the input device at an impact are compared with each other, thereby a ball hitting position is determined, and the thus determined ball hitting position is reflected in the path of the shot. As a result, achieved is a game device enabling a realistic shot where the user feels as if he/she is actually hitting a ball with a golf club and also the swing of the input device is reflected in the path of the ball in the golf game.

Figure 1:
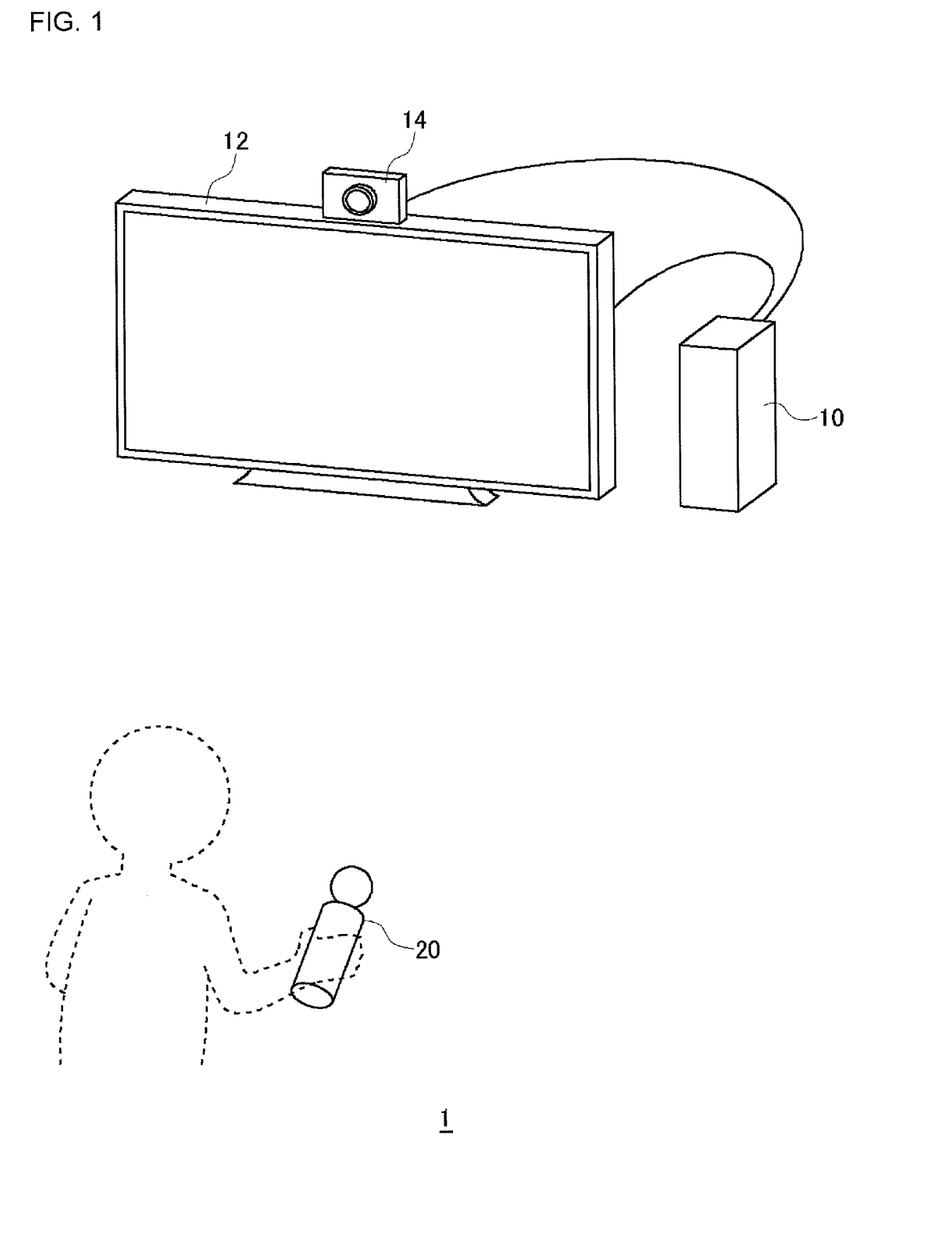
FIG. 1 illustrates a usage environment of an game system according to an exemplary embodiment of the present invention.

FIG. 1 illustrates a usage environment of a game system 1 according to an exemplary embodiment of the present invention. The game system 1 includes a game device 10 that executes game software, a display apparatus that outputs a result processed by the game device 10, an input device 20, and an image pickup apparatus 14 that picks up images of the input device 20.

The input device 20 is an operational input device by which a user gives operation instructions. The game device 10 is a processing apparatus that processes a game application based on the operation instructions from the input device 20 and thereby produce image signals indicating a processing result of the game application.

The input device 20 has a function of transmitting user's operation instructions to the game device 10. In the present exemplary embodiment, the input device 20 is structured as a wireless controller capable of performing wireless communication with the game device 10. The input device 20 and the game device 10 may establish wireless communication therebetween using Bluetooth (registered trademark) protocol. It is to be noted here that the input device 20 is not limited to a wireless controller but may be a wired controller connected to the game device 10 through a cable.

The input device 20 is powered by battery and is structured by including a plurality of buttons for effecting the operation instructions to perform a game. When the user operates such buttons on the input device 20, the operation instructions are transmitted wirelessly to the game device 10. The game device 10 receives the operation instructions from the input device 20, controls the progress of the game according to the operation instructions, and generates game image signals. The game image signals thus generates are outputted from the display apparatus 12.

The image pickup apparatus 14 is a video camera, comprised of CCD image pickup elements or CMOS image pickup elements, which picks up images of real space at predetermined cycles and produces frame images per cycle. The frame rate of the image pickup apparatus 14 may be 30 frames per second, for example, such that the frame rate thereof may coincide with the frame rate of the display apparatus 12. The image pickup apparatus 14 connects to the game device 10 via a universal serial bus (USB) or other interfaces.

The display apparatus 12, which is a display for outputting images, receives the image signals generated by the game device 10 and then displays a game screen. The display apparatus 12 may be a television set that has a display and a speaker or may be a computer display. The display apparatus 12 may be connected to the game device 10 by a cable or connected wirelessly thereto by a wireless LAN (Local Area Network).

In the game system 1, the input device 20 has a light-emitting element. The light-emitting element emits light in a predetermined color in a game and the illuminated light-emitting element is captured by the image pickup apparatus 14. The image pickup apparatus 14 takes images of the input device 20 and thereby generates frame images so as to supply the thus generated frame images to the game device 10. The game device 10, which acquires the frame images, derives the information on the position of the light-emitting element in the real space, based on the position and size of images of the light emitting element in the frame images. The game device 10 treats the positional information as an operation instruction for the game and reflects the positional information in processing the game such as in controlling the operation of a player's character. The game device 10 according to the present exemplary embodiment has a function of processing a game application by using not only the input of user's operations through the buttons and the like but also the acquired positional information on the images of the light-emitting element.

The light-emitting element of the input device 20 is configured in such a manner as to be capable of emitting light in a plurality of colors. Depending on an instruction from the game device 10 as to the emission of light, the light-emitting element can vary the emission color.

Also, the input device 20 has an acceleration sensor and a gyro sensor. The detected values of the sensors are transmitted to the game device 10 on a predetermined cycle. The game device 10 acquires these detected values of the sensors and thereby obtains the information on the posture (position, orientation) of the input device 20 in the real space. The game device 10 treats the orientation information as an operation instruction for the game and reflects the orientation information in processing the game. As described above, the game device 10 according to the present exemplary embodiment has a function of processing a game application by using also the acquired orientation information on the input device 20.

Figure 2A:
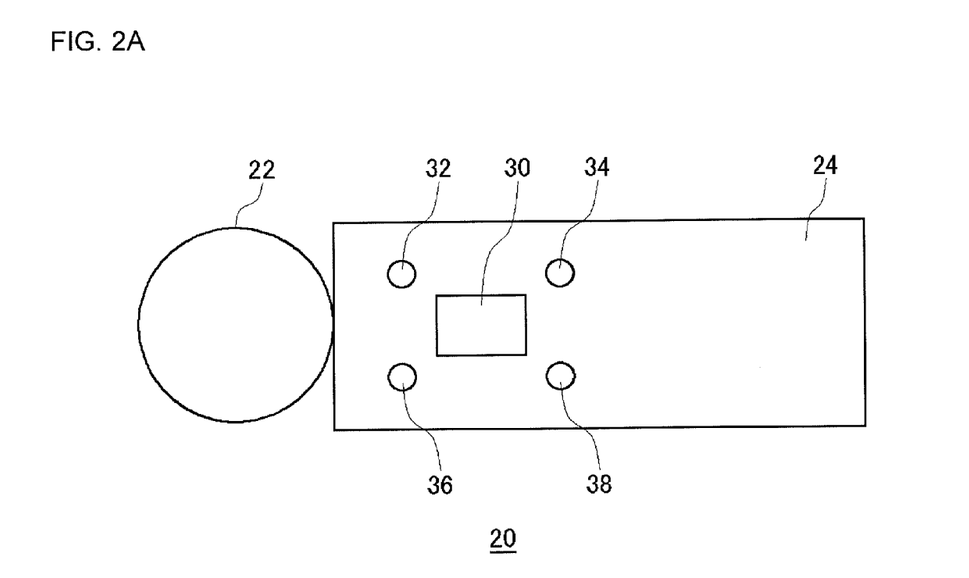
FIGS. 2A and 2B each illustrates an external structure of an input device.
Figure 2B:
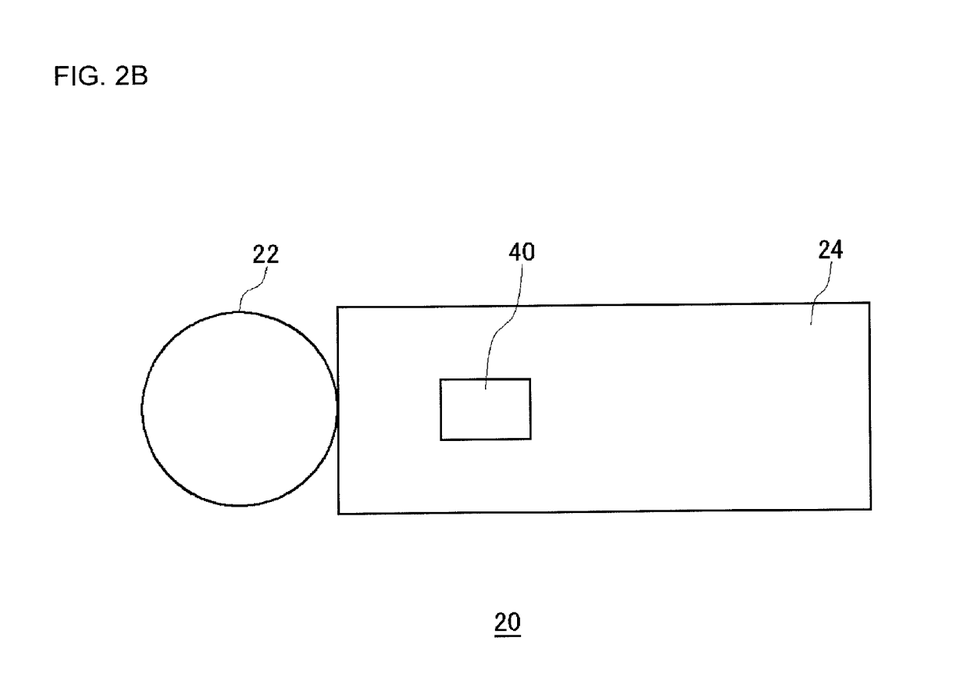

FIGS. 2A and 2B each illustrates an external structure of the input device 10. FIG. 2A shows a structure of the input device 10 viewed from top, and FIG. 2A shows a structure thereof viewed from bottom. The input device 20 has a light-emitting element 22 and a handle 24. The light-emitting element 22 is such that the outside thereof is formed in a spherical shape and formed of a resin having optical transparency and such that a light-emitting device such as a light-emitting diode or an electric bulb is provided inside the light-emitting element 22. As the light-emitting device provided inside emits light, the entire sphere on the outside glows. Operation buttons 30, 32, 34, 36, and 38 are provided on the top surface of the handle 24, and an operation button 40 is provided on the bottom surface thereof. The user, while holding an end of the handle 24 with a hand, operates the operation buttons 30, 32, 34, 36, and 38 with the thumb and operates the operation button 40 with the index finger. The operation buttons 30, 32, 34, 36, and 38 are push-type buttons, and the user operates the buttons by pressing them down. The operation button 40 may be such that an analog amount can be inputted.

The user plays the game while looking at the game screen displayed on the display apparatus 12. The image pickup apparatus 14, which must take images of the light-emitting element 22 while the game application is running, is preferably arranged such that the image pickup range of the image pickup apparatus 14 is oriented in the same the direction as that of the display apparatus 12. In general, the user plays the game while facing the display apparatus 12. Thus, the image pickup apparatus 14 is arranged such that the direction of the optical axis of the image pickup apparatus 14 coincides with the frontal direction of the display apparatus 12. More to the point, the image pickup apparatus 14 is preferably arranged in the vicinity of the display apparatus 12 such that the position in which the user can view the display screen of the display apparatus 12 is included in the image pickup range. As a result, the image pickup apparatus 14 can take images of the input device 20.

Figure 3:
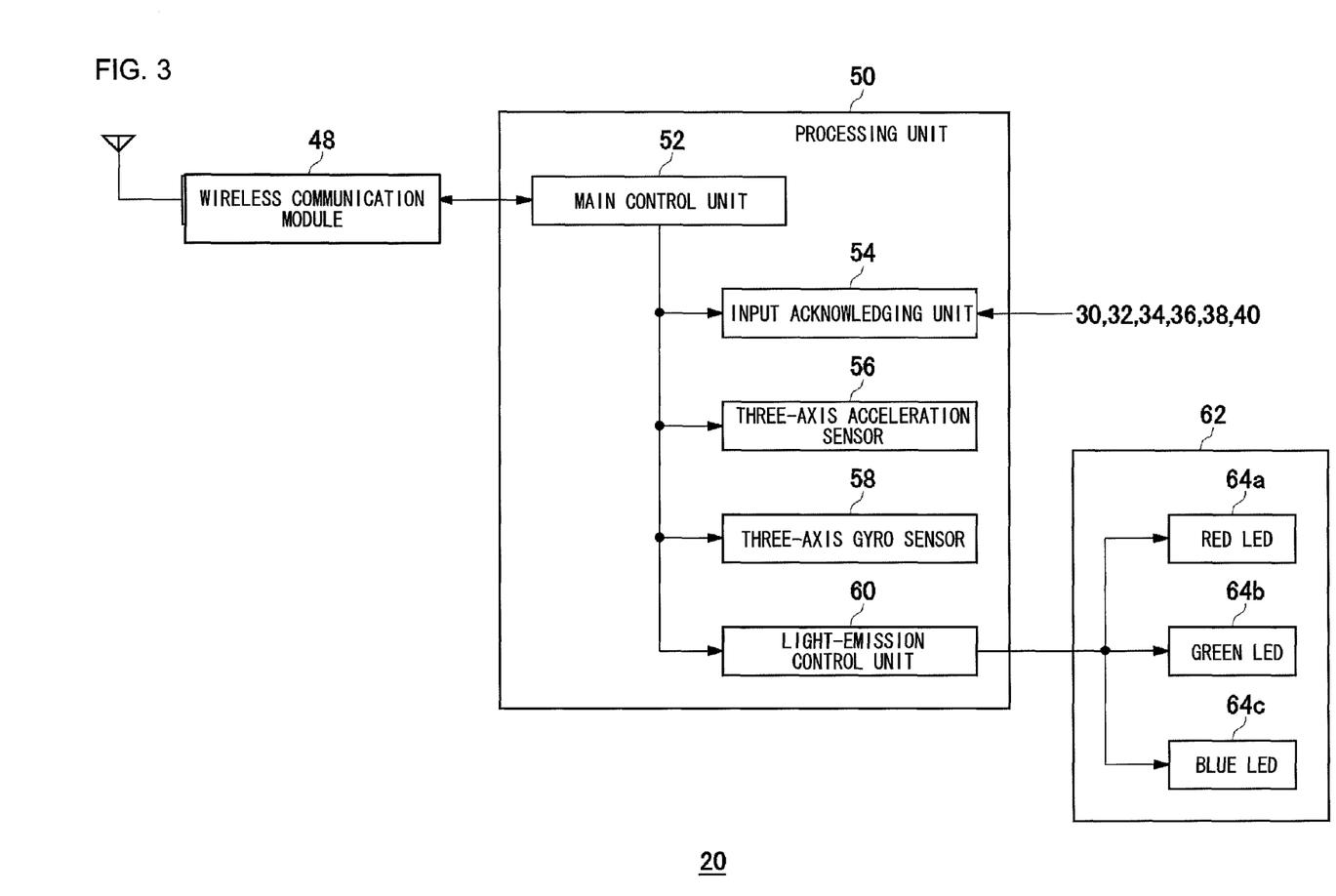
FIG. 3 illustrates an internal structure of an input device.

FIG. 3 illustrates an internal structure of the input device 10. The input device 20 includes a wireless communication module 48, a processing unit 50, a light emission unit 62, and operation buttons 30, 32, 34, 36, 38, and 40. The wireless communication module 48 has a function of transmitting and receiving data between the game device 10 and the wireless communication module 48.

The processing unit has a main control unit 52, an input receiving unit 54, a 3-axis acceleration sensor 56, a 3-axis gyro sensor 58, and a light emission control unit 60. The main control unit 52 sends and receives necessary data to and from the wireless communication module 48.

The input receiving unit 54 receives input information from the operation buttons 30, 32, 34, 36, 38, and 40 and sends the input information to the main control unit 52. The 3-axis acceleration sensor 56 detects acceleration components in three axial directions of XYZ. The 3-axis gyro sensor detects angular velocities in XZ, ZY, and YX planes. It is to be noted here that the width direction of the input device 20 is set to the X axis, the height direction thereof is set to the Y axis, and the longer direction thereof is set to Z axis. The 3-axis acceleration sensor 56 and the 3-axis gyro sensor 58 are placed inside the handle 24 of the input device 20 and is preferably placed near the center of the handle 24. The wireless communication module 48 transmits information of values detected by the 3-axis acceleration sensor 56 and information of values detected by the 3-axis gyro sensor 58 together with the input information from the operation buttons to a wireless communication module of the game device 10 in a predetermined cycle. The transmitting cycle is set to 11.25 msec, for instance.

The light emission control unit 60 controls the light emission of the light emission unit 62. The light emission unit 62, which has a red LED 64a, a green LED 64b, and a blue LED 64c, is capable of emitting light in a plurality of colors. The light emission control unit 60 adjusts the light emission of the red LED 64a, the green LED 64b, and the blue LED 64c and thereby has the light emission unit 62 emit light having a desired color.

Upon receipt of the emission instruction from the game device 10, the wireless communication module 48 supplies the emission instruction to the main control unit 52, which in turn supplies the emission instruction to the light emission control unit 60. The light emission control unit 60 controls the light emission of the red color LED 64a, the green LED 64b, and the blue LED 64c such that the light emission unit 62 emits light in a color specified by the emission instruction. For example, the light emission control unit 60 may control the lighting by controlling the pulse width modulation (PWM) of each LED.

Figure 4:
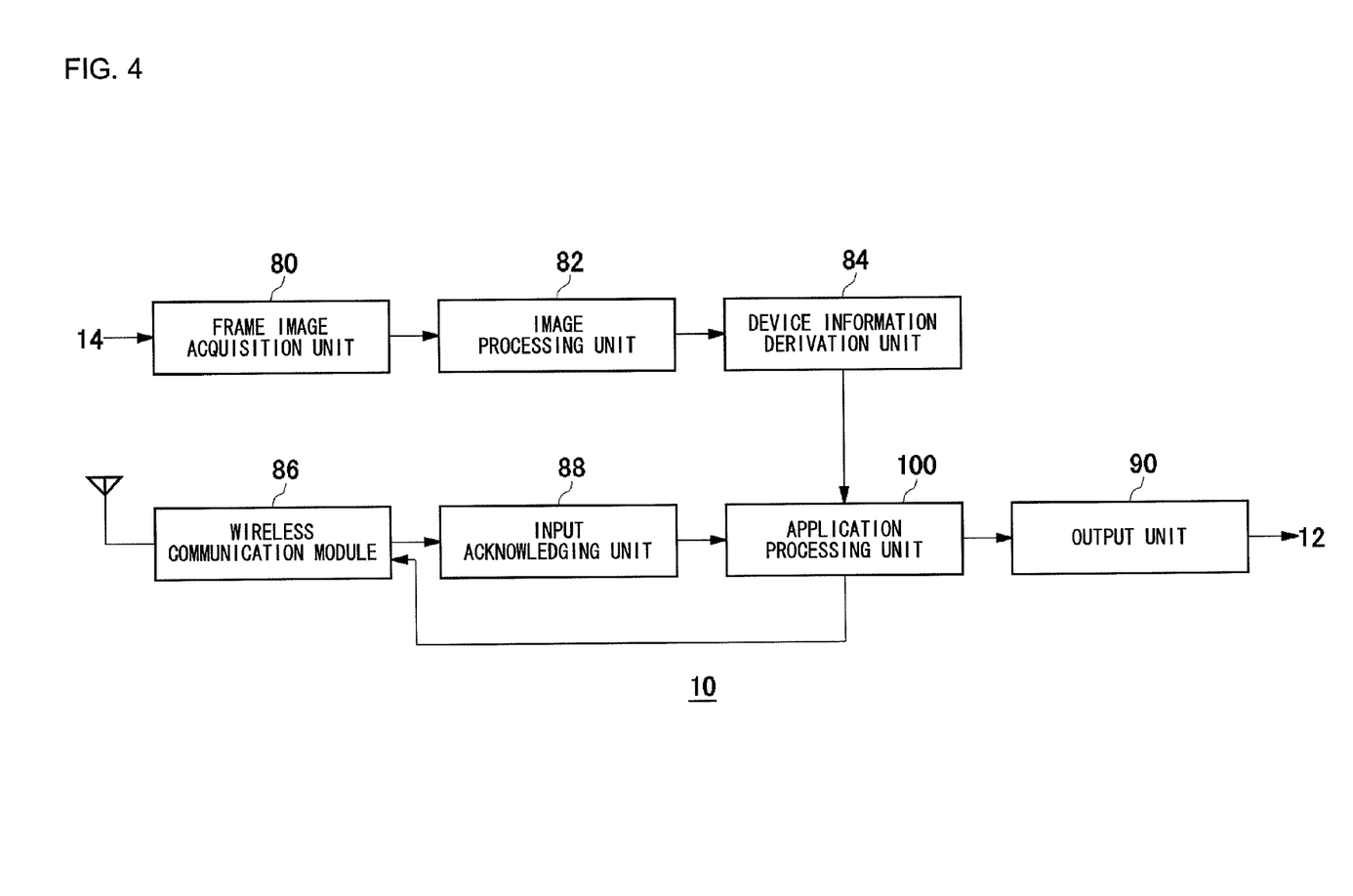
FIG. 4 illustrates a structure of a game device.

FIG. 4 illustrates a structure of the game device 10. The game device 10 includes a frame image acquiring unit 80, an image processing unit 82, a device-information derivation unit 84, a wireless communication module 86, an input receiving unit 88, an output unit 90, and an application processing unit 100. The processing functions in the game device 10 according to the present exemplary embodiment may be achieved by a CPU, memory, memory-loaded programs, and so forth. Depicted herein is a structure achieved by cooperation of these elements and programs. The programs may be built into the game device 10 or may be stored in a recording medium and supplied externally. Therefore, it will be obvious to those skilled in the art that these functional blocks may be implemented by a variety of manners including hardware only, software only or a combination of both. It is to be noted here that the game device 10 may have a plurality of CPUs for the purpose of hardware configuration.

The wireless communication module 86 establishes wireless communication with the wireless communication module 48 of the input device. As a result, the input device 20 can transmit the status information on the operation buttons and the information of values detected by the 3-axis acceleration sensor 56 and the 3-axis gyro sensor 58 to the game device 10 in a predetermined cycle.

The wireless communication module 86 receives the status information on the operation buttons and the information of values detected by sensors transmitted from the input device 20 and supplies them to the input receiving unit 88. The input receiving unit 88 separates the button status information and the sensor detection value information from each other and then passes each of them on to the application processing unit 100. The application processing unit 100 receives the button status information and the sensor detection value information as the operation instructions for the game. The application processing unit 100 treats the sensor detection value information as the orientation information on the input device 20.

The frame image acquiring unit 80 is formed as a USB interface and acquires frame images from the image pickup apparatus 14 at a predetermined frame rate (e.g., 30 frames per second). The image processing unit 82 extracts the images of the light-emitting element from the frame images. The image processing unit 82 identifies the positions and sizes of the light-emitting element images in the frame images. If the light-emitting element 22 of the input device 20 emits light having a color, for example, which is less likely to be used in a user environment, the image processing unit 28 can extract the light-emitting element images from the frame images with a high degree of accuracy. The image processing unit 82 may digitalize frame image data by using a predetermined threshold value and thereby generate digitalized images. In this digitalization processing, the pixel value of a pixel having a luminance larger than the predetermined threshold value is coded as "1", and the pixel value of a pixel having a luminance smaller than or equal to the predetermined threshold is coded as "0". The light emitting element emits light of luminance greater than the predetermined threshold value, so that the image processing unit 82 can identify the position and size of the light-emitting element from the digitalized images. For example, the image processing unit 28 identifies the barycentric coordinates of the light-emitting element images and the radii of the light-emitting element images in the frame images.

The device-information derivation unit 84 derives the information on the position of the input device 20 viewed from the image pickup apparatus 14, from the position and size of the light-emitting element identified by the image processing unit 82. The device-information derivation unit 84 derives positional coordinates in camera coordinates from the barycentric coordinates of the light-emitting element images and derives information of a distance from the image pickup apparatus 14, from the radius of the light-emitting element image. The positional coordinates and the distance information constitute the positional information on the input device 20. The device-information derivation unit 84 derives the positional information on the input device 20 for each frame image and passes the derived information on to the application processing unit 100. The application processing unit 100 receives the positional information on the input device 20 as the operation instruction for the game.

The application processing unit 100 performs a game based on the positional information and the orientation information of the input device 20 and the button status information thereof, and generates image signals indicating the processing result of the game application. The image signals are sent from the output unit 90 to the display apparatus 12 and then outputted as display images.

Figure 5:
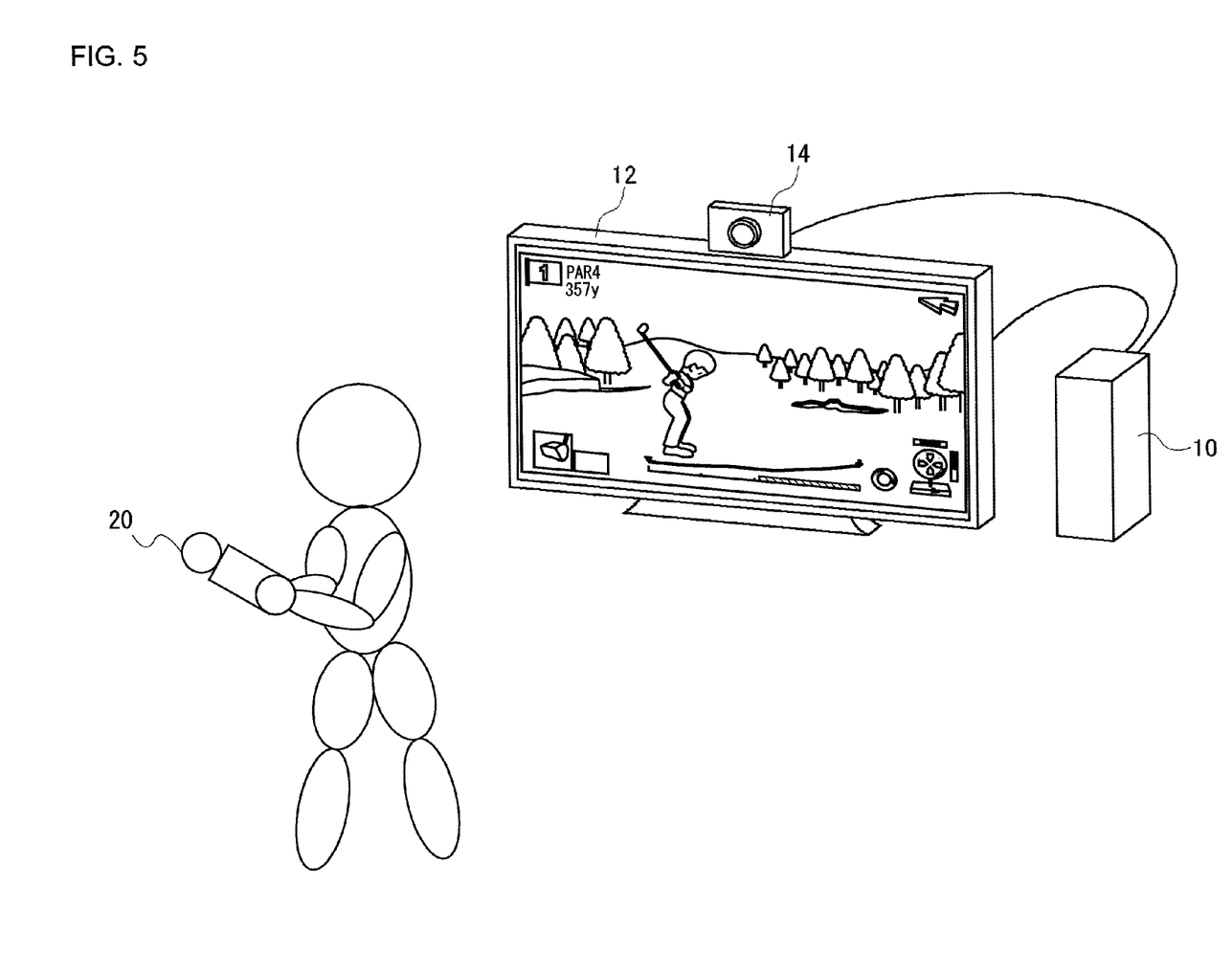
FIG. 5 illustrates how a user strikes a shot in a game system according to an embodiment.

FIG. 5 illustrates how a user strikes a shot in a game system according to an embodiment. As the user swings the input device 20 while holding it as if it were a golf club, the game device 10 acquires the movement trajectory of the input device 20 by having the image pickup apparatus 14 capture the images of the input device 20 and then has the player's character, displayed on the display apparatus 12, swing in time with the user's swinging of the input device 20. Also, as will be discussed later, the power of the shot and the impact position are determined according to the trajectory of the user's swinging thereof and then reflects the thus determined power and impact position in the path of a ball.

Figure 6:
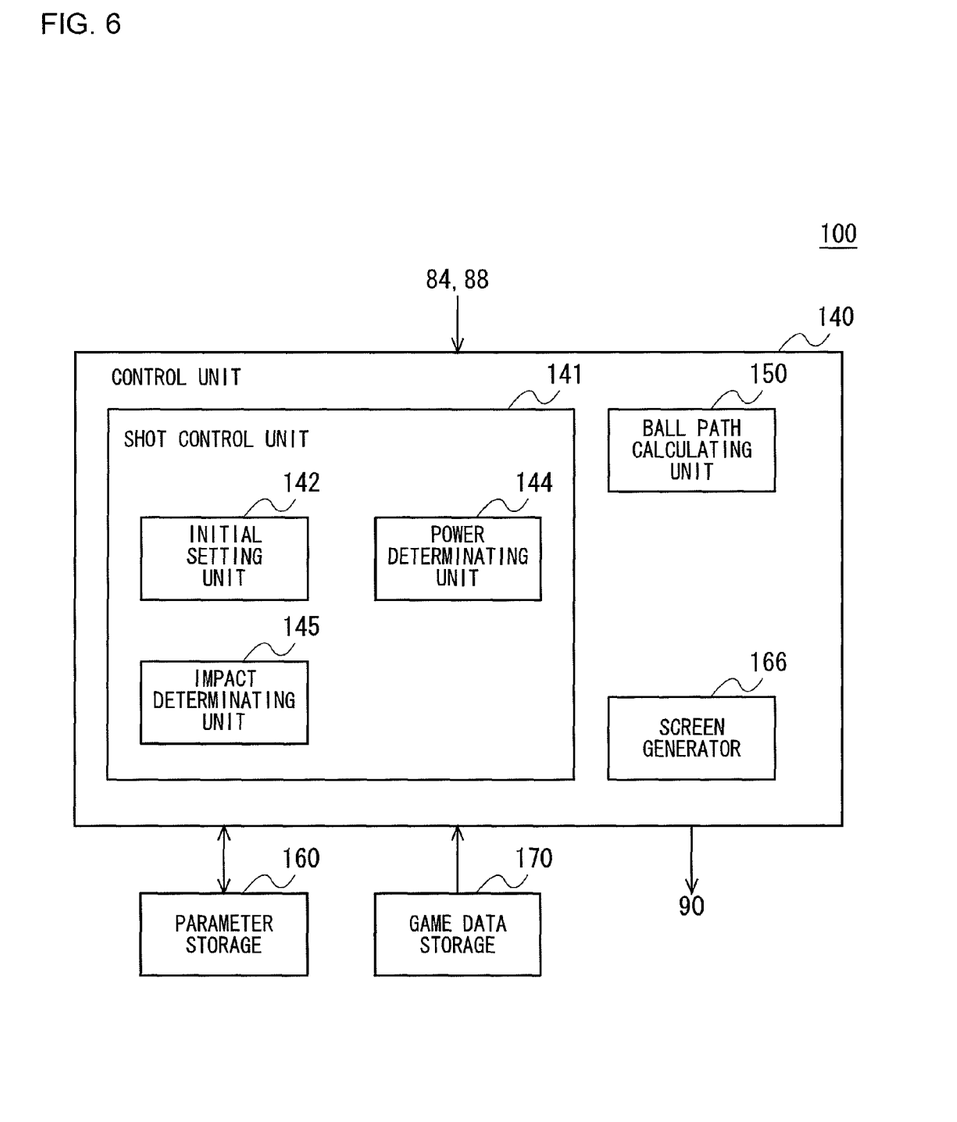
FIG. 6 illustrates a structure of an application processing unit.

FIG. 6 illustrates a structure of the application processing unit 100. The application processing unit 100 includes a control unit 140, a parameter storage 160, and a game data storage 170. The control unit 140 includes a shot control unit 141, a ball path calculating unit 150, and a screen generator 166. The shot control unit 141 includes an initial setting unit 142, a power determining unit 144, and an impact determining unit 145. These components may also be implemented in a variety of manners including hardware only, software only or a combination of both.

The control unit 140 reads a program from the game data storage 170, where a program for a golf game is stored, and executes the program. Then the control unit 140 performs the golf game by controlling the action of a player's character, which serves as a golf player in a game world, based on the input of user's operations received from the input device 20. The parameter storage 160 stores parameters necessary for the progress of the golf game. The game data storage 170 stores game data. The screen generator 166 generates a game screen controlled by the control unit 140 and outputs the generated game screen from the output unit 90 so as to be displayed on the display apparatus 12.

Figure 7:
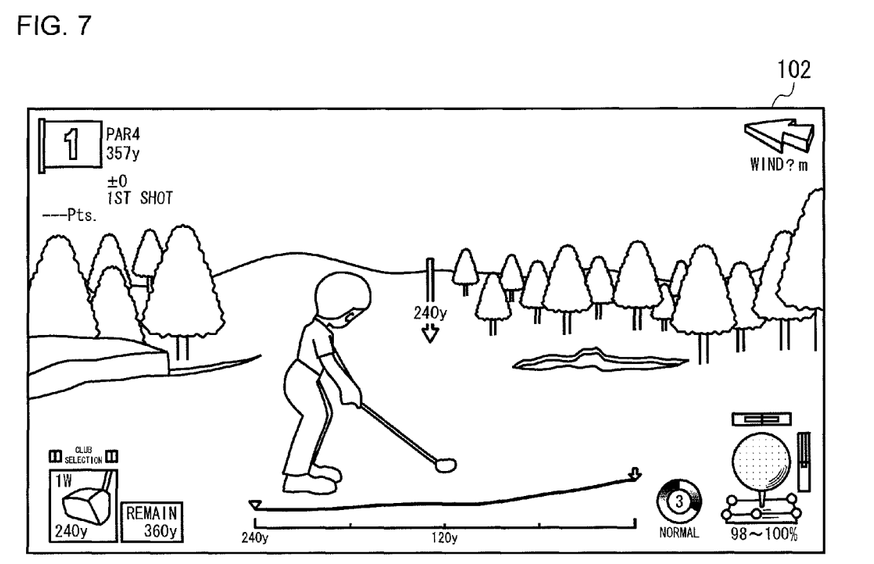
FIG. 7 illustrates an example of game screen when a player's character strikes a shot.

FIG. 7 illustrates an example of game screen when the player's character strikes a shot. Displayed on a screen 102 are an image where the land features of a hall in action on a golf course are rendered and an image where the player's character is viewed from behind. On this screen 102, the user operates on the input device 20 and thereby determines the power and the impact of a shot struck and has the player's character strike the shot.

The initial setting unit 142 has the image pickup apparatus 14 capture an image of the user in the posture (attitude) where the user holds the input device 20 and is at address just before hitting the ball and an image of the user in the posture where the user extends his/her arms in front of him/her before swinging with a follow-through. Then the initial setting unit 142 acquires the positions of the input device 20 in the respective postures. The initial setting unit 142 calculates the distances between those positions and stores them in the parameter storage 160 as parameters for correction. The correcting parameter is almost proportional to the length of an arm of the user. As will be described later, the power determining unit 144 determines the degree of swing from the position of the input device 20 where the user swings the input device 20 back, and reflects the thus determined degree of swing in the power. However, since the position of the input device 20 where the user swings it back differs depending on the length of the arm of users, the correction is made by referencing the correcting parameter calculated by the initial setting unit 142. The initial setting unit 142 calculates a plane, parallel to the vertical direction, which passes through the positions of the input device 20 in the aforementioned two postures, and stores the thus calculated plane as a swing plane. If the swing plane and the line of sight of the image pickup apparatus 14 differ at a predetermined angle or above, the initial setting unit 142 may prompt the user to correct his/her address.

The power determining unit 144 determines the power of a shot struck by the player's character. As an operation input to which an instruction to start the shot has been assigned is received from the input device 20, the power determining unit 144 acquires from the input receiving unit 88 the information regarding the posture of the input device 20. The power determining unit 144 determines if the user sets the input device 20 at a proper address position. For example, a sensor value is obtained from the 3-axis acceleration sensor 56 or the 3-axis gyro sensor 58 to calculate the posture of the input device 20 and whether the calculated posture thereof is within a predetermined range or not is determined. If the posture of the input device 20 is not within the predetermined range, the power determining unit 144 will prompt the user to hold the input device 20 so that he/she can be at a proper address position. If the posture of the input device 20 is within the predetermined range, the power determining unit 144 will acquire the positional coordinates and the positional information including the distance information from the device-information derivation unit 84, stores them in the parameter storage 160 as the reference position, and starts controlling the shot struck by the user.

The power determining unit 144 obtains the positional information on the input device 20 at predetermined intervals from the device-information derivation unit 84 and compares it against the reference position of the input device 20 stored in the parameter storage 160 so as to determine the degree of swing by the user. At this time, the power determining unit 144 corrects the degree of swing by referencing the correcting parameter set by the initial setting unit 142. For example, the degree of swing may be determined as follows. That is, the distance between the present position and the reference position of the input device 20 is first calculated. Then, the larger the correcting parameter is (namely, the longer the length of the arm of the user is), a smaller value is multiplied by the distance so as to calculate a correction value; the smaller the correcting parameter is (namely, the shorter the length of the arm of the user is), a larger value is multiplied by the distance so as to calculate a correction value. Then the degree of swing is determined from the calculated correction value. The power determining unit 144 may correct the degree of swing in further consideration of the swing plane and the orientation of the image pickup apparatus 14. The power determining unit 144 may store the correspondence between the degrees of swing and the correction values in the game data storage 170 and may obtain a degree of swing associated with the calculated correction value. Depending on the positional relation between the image pickup apparatus 14 and the user, there are cases where the input device 20 is hidden behind the head or body of the user while he/she swings the input device 20 back and therefore the image of input device 20 is not taken by the image pickup apparatus 14. In such a case, the power determining unit 144 may calculate the movement trajectory and the velocity of the input device 20 while the images of the input device 20 are captured, and may estimate the position of the input device 20 by extrapolation and the like. Also, the sensor value of the 3-axis acceleration sensor 56 or the 3-axis gyro sensor 58 may be acquired and thereby the position of the input device 20 may be calculated.

The power determining unit 144 displays how the player's character swings the club, in response to the determined degree of swing. The power determining unit 144 may store beforehand a plurality of images, which express the process of how the player's character swings the club, in the game data storage 170 in such a manner that the plurality of images are associated with the degrees of swing. Then the power determining unit 144 may read out an image that matches with the determined degree of swing so as to be displayed. Also, the information on the posture when the player's character swings the club may be stored beforehand in the game data storage 170 in such a manner that the posture information is associated with the degrees of swing. Then the three-dimensional shape data on the player's character may be rendered by using the posture information that matches with the determined degree of swing. This has an effect of making the player's character seem to swing the club in response to the user's actual swing.

The power determining unit 144 displays on the screen the power level of a shot according to the determined degree of swing. As will be described later, the power determining unit 144 calculates the power of the shot based on a value indicating how far the user has swung back and the velocity of the input device 20 at the time of the impact. And a power gauge in accordance with the degree of swing-back is displayed as an estimated level of the power of the shot when the ball is hit as a result of downswing from a swing-back position. The power determining unit 144 may output sound when the degree of swing-back, namely the estimated level of the power, has reached predetermined value(s). Or the input device 20 may vibrate or emit light when the estimated level of the power has reached the predetermined value. For example, the input device 20 may vibrate when the degree of swing-back has reached 50% and 100%.

Figure 8:
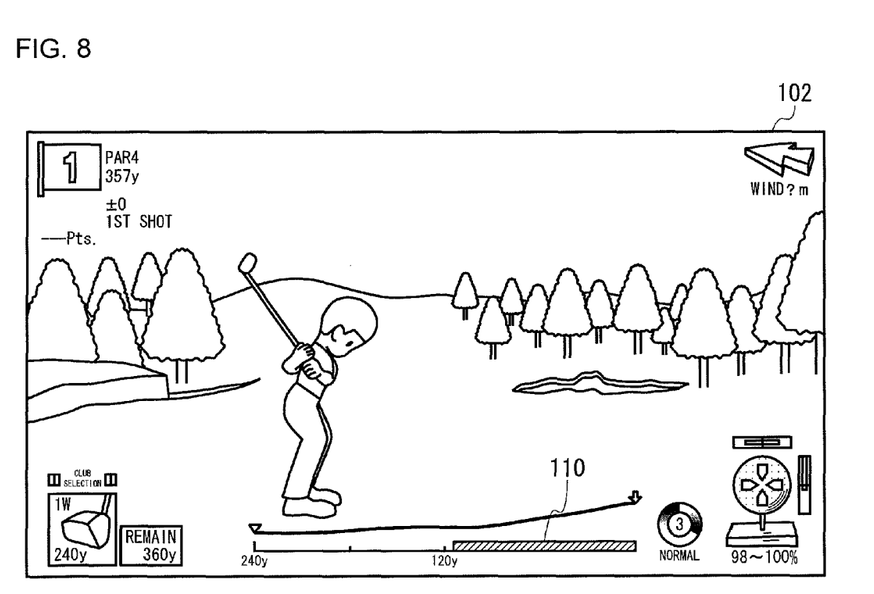
FIG. 8 illustrates an example of game screen when a player's character strikes a shot.

FIG. 8 illustrates an example of game screen when the player's character strikes a shot. Displayed on the screen 192 is how the player's character swings the club in response to the degree of user's swing. Also displayed on the screen 102 is a power gauge 110 that indicates an estimated level of the power of the shot, when the ball is hit as a result of downswing from the swing-back position, in response to the determined degree of user's swing-back.

As the user starts the downswing and then the input device 20 comes closer to the image pickup apparatus 14 than the reference position at the start of a shot, the power determining unit 144 calculates the power of the short based on the value indicating how far the user has swung back and the velocity of the input device 20 at the time of the impact. When the shot is started and the distance between the input device 20 and the image pickup apparatus 14 becomes wider and then the distance therebetween becomes again equal to the value at the start of the shot, the power determining unit 144 regards this moment as the instant of impact and regards the maximum of the degrees of swing so far as the degree of swing-back. Also, the power determining unit 144 acquires the velocity of the input device 20 at the instant of impact. The power determining unit 144 may calculate the velocity of the input device 20 by acquiring the sensor value of the 3-axis acceleration sensor 56 or the 3-axis gyro sensor 58 or may calculate the velocity of the input device 20 from the positional information on the input device 20 obtained from the device-information derivation unit 84. The power determining unit 144 calculates the power from the degree of swing-back and the velocity of the input device 20 and then conveys the calculated power to the ball path calculating unit 150. Control is performed in a manner such that the larger the degree of swing-back or the higher the velocity of the input device 20, the larger the power becomes.

The impact determining unit 145 obtains the positional information on the input device 20 at the instant of impact from the device-information derivation unit 84, compares this against the reference position at the start of the shot, and thereby determines the position at which the ball is hit by a club head. The impact determining unit 145 obtains the positional coordinates of the input device 20 when the distance becomes equal to the distance between the input device 20 in the reference position and the image pickup apparatus 14. If no such positional information as to when the distance becomes equal is available, the impact determining unit 145 may obtain the positional coordinates thereof when the distance becomes equal, from the positional coordinates of a plurality of previous and next frames by interpolation or extrapolation. For example, the trajectory of the input device 20 may be approximated by a three-dimensional curve (three-order curve), which is expressed by a polynomial equation or the like, by using three previous and next frames or the last three frames, and the positional coordinates when the distance becomes equal on a cubic approximation curve may be calculated. The impact determining unit 145 may calculate the distance between the input device 20 through the downswing and the image pickup apparatus 14 by acquiring the sensor value of the 3-axis acceleration sensor 56 or the 3-axis gyro sensor 58. For example, a relative position of the input device 20 in relation to the reference position may be calculated by integrating the acceleration components parallel to the swing plane. The impact determining unit 145 calculates a shift amount between the reference position of the input device 20 at the start of the shot and the position of the input device 20 at the time of the impact and thereby determines the position of the impact according to the shift amount therebetween.

Figure 9:
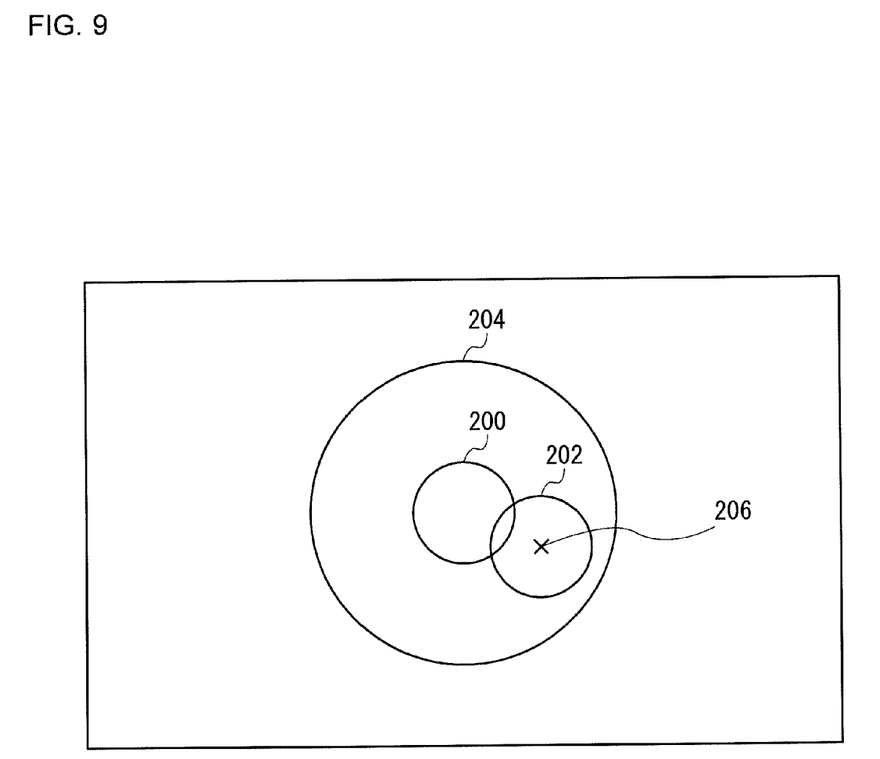
FIG. 9 is a diagram used to explain a method for determining an impact position.

FIG. 9 is a diagram used to explain a method for determining the impact position. FIG. 8 shows the position of the light-emitting element 22 at the start of a shot and the position of the light-emitting element 22 at the time of an impact. The impact determining unit 145 may simulate a golf ball 204 having a predetermined radius where the center position of the light-emitting element 22 is the center in a position 200, and may determine that the club head hits a center position 206 of the light-emitting element 22 in the position 202. In this case, the radius of the golf ball 204 may be adjusted according to the attribute of the player's character or the level of the user. For example, where a player's character for beginners is used, the radius of the golf ball 204 may be made larger and a displacement between the reference position and the position at the time of the impact may be set such that the displacement therebetween is less likely to be reflected in the displacement of the impact position. Conversely, where a player's character for the advanced players is used, the radius of the golf ball 204 may be made smaller and the displacement therebetween may be set such that it is more likely to be reflected in the displacement of the impact position. If the displacement (shift amount) is within a predetermined range, the impact determining unit 145 may determine that the user has hit the center position of the ball. The impact determining unit 145 conveys the determined impact position to the ball path calculating unit 150.

The ball path calculating unit 150 calculates, by a physical calculation, the path of the ball hit by the player's character, based on the power and the impact of the shot determined by the shot control unit 141 and the external factors such as ball's lie, wind and land features.

The ball path calculating unit 150 reads out the initial velocity and the loft angle preset according to a golf club used for the shot, from the parameter storage 160. The ball path calculating unit 150 determines the direction where the ball flies, based on the read-out loft angle and the impact position notified from the impact determining unit 145. The ball path calculating unit 150 adjusts the initial velocity of the ball according to the power determined by the power determining unit 144, the impact position determined by the impact determining unit 145, the attribute values, such as the body strength, set for each player's character, the ball's lie and so forth. For example, the percentage value of the power may be multiplied by the initial velocity in a manner such that the higher the power, the faster the initial value will be. Also, the flying direction of the ball and the velocity of the ball may be adjusted in a manner such that the more deviating from the center of the ball is the impact position, the farther away from the targeted landing spot the ball hits the ground. For example, when the ball is hit to the left, a slice may be hit by curving the trajectory of the ball to the right; when the ball is hit to the right, a hook may be hit by curving the trajectory of the ball to the left. Also, when the power is less than or equal to a lower limit or when the impact position is off the center of the ball by a predetermined value or above, such a shot may be regarded as a missed shot and therefore the ball path may be calculated using an extremely small initial velocity. If the ball is caught in rough or bunker, the initial velocity may be lower than in fairway. Also, if the inclination of the ground contact area of the ball is large, the initial velocity may be reduced. If the input of a user's operation is entered such that a player changes the initial velocity and the loft angle, the initial velocity and the loft angle may be adjusted in further consideration of the effect of such a change.

As the ball path calculating unit 150 determines the initial velocity and the loft angle, the ball calculating unit 150 calculates the position of the ball for each frame while adjusting the velocity of the ball in response to the force acting on the ball. The ball path calculating unit 150 adds a frame-by-frame velocity to the coordinates of the present position of the ball and thereby calculates the coordinates of the position of the ball for the next frame. The force of gravity, lift force, force of wind, and air resistance are added to the velocity of the ball for each frame. Assume that the acceleration on a ball due to the force of gravity is 9.8 meters/sec$^2$ downward that conforms with the law of physics. Assume herein that the lift force acts upward and is proportional to the velocity of the ball. The force of wind may have a constant velocity in a constant direction at all locations of each hall or may be varied according to the locations. Assume that the air resistance is in a direction opposite to the traveling direction of the ball and is assigned a value proportional to the velocity thereof. In this manner, calculating the ball path in consideration of the direction of wind and the velocity of the ball can create a difficult situation of striking a shot considering the effect of wind similarly to the actual golf playing, thereby achieving a more realistic golf game.

If the ball hits an object, the speed of the ball in the horizontal direction and the vertical direction will be adjusted based on a friction coefficient and a restitution coefficient preset according to the attribute of the surface with which the ball has collided. The friction coefficient and the restitution coefficient may be set to different values depending on where the location is, namely, fairway, rough, bunker or the like. Further, the ball path calculating unit 150 may add a special calculation that has nothing to do with the law of physics, as an dramatic and entertainment effect. This diversifies the golf game, thereby making it possible to improve the amusement the game provides.

The screen generator 166 sets the eye position and the line of sight of the camera according to the position of the ball calculated by the ball path calculating unit 150 so that the ball can be located within the screen, and then generates a game screen displaying how the fall flies. When the ball stops, the image generator 166 proceeds to the next shot.

Figure 10:
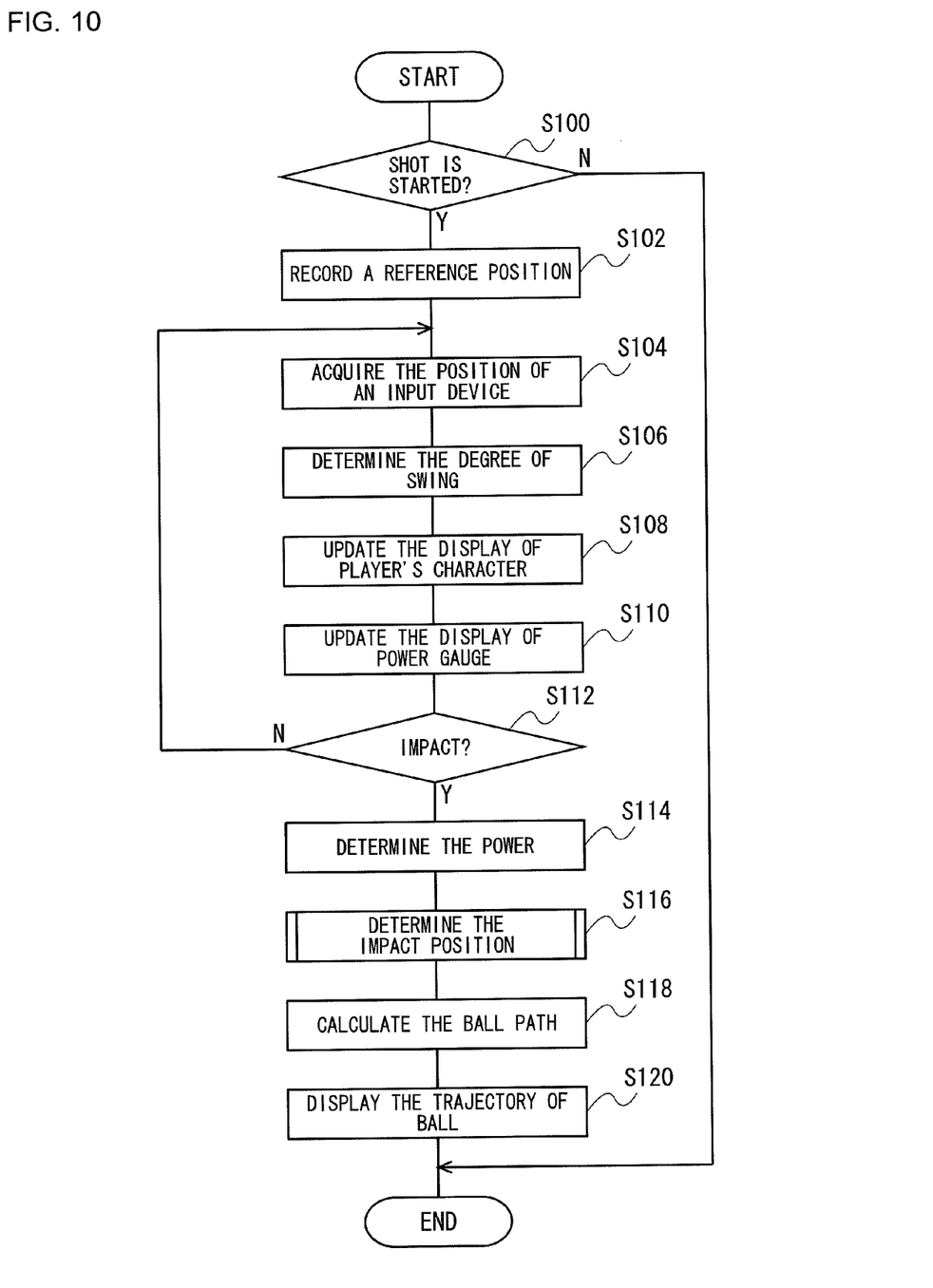
FIG. 10 is a flowchart showing a method for controlling a game according to an embodiment.

FIG. 10 is a flowchart showing a method for controlling a game according to an embodiment. As the user starts the shot by pressing down on the operation buttons 30 (Y of S100), the power determining unit 144 acquires the position of the then input device 20 and records it in the parameter storage 160 as a reference position (S102). During a swing of the input device 20 by the user, the power determining unit 144 acquires the position of the input device 20 (S104), determines the degree of swing (S106), updates the display of the player's character in response to the degree of swing (S108), and updates the display of the power gauge 110 serving as an indicator that indicates an estimated level of the power (S110). The power determining unit 144 repeats the procedures of S104 to S110 until it is determined that the ball is hit with an obvious impact on the ball struck.

As the distance between the input device 20 and the image pickup apparatus 14 is equal to the distance therebetween in the reference position, the power determining unit 144 determines that the ball is struck (i.e., the ball has the impact as a result of a hit) (Y of S122) and determines the power of the shot based on the degree of swing-back and the speed of the input device 20 at the time of an impact (S114). The impact determining unit 145 compares the position of the input device at the time of the impact and the reference position at the start of the shot and thereby determines an impact position (S116). The ball path calculating unit 150 calculates the path of the ball based on the determined power and the determined impact position (S118), and the screen generator 166 generates the calculated ball path on the screen (S120). If the shot has not yet been started (N of S100), all the procedures will be skipped.

Figure 11:
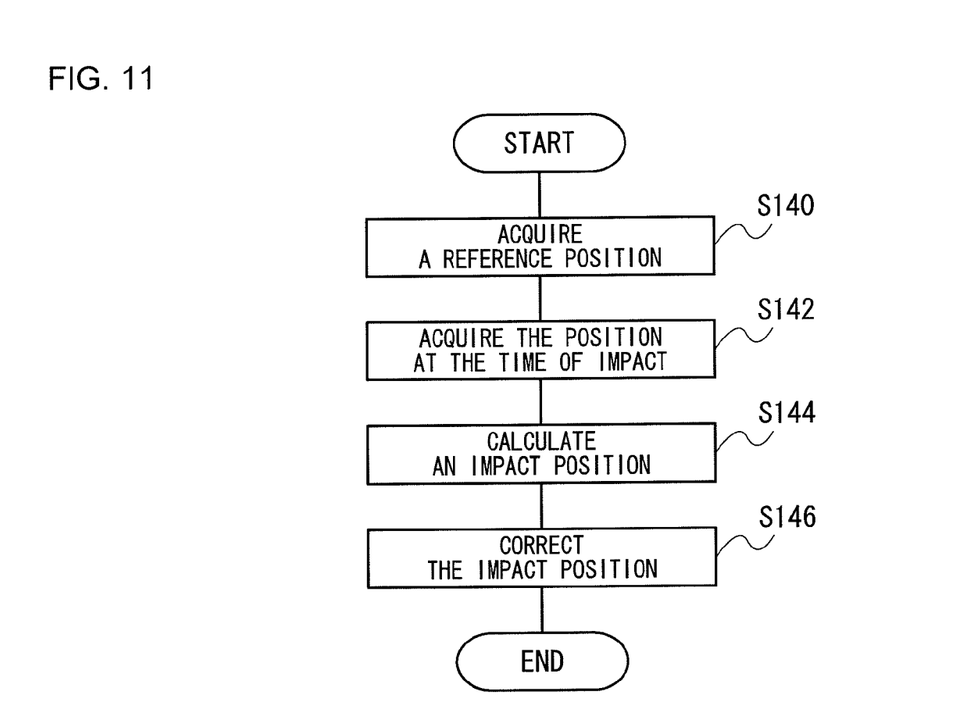
FIG. 11 is a flowchart showing a detailed procedure for Step S116 of FIG. 10.

FIG. 11 is a flowchart showing a detailed procedure for Step S116 of FIG. 10. The impact determining unit 145 acquires not only the reference position of the input device 20 at the start of the shot (S140) but also the position of the input device 20 at the time of the impact (S142), and calculates a shift amount therebetween so as to calculate the position of the impact (S144). The impact determining unit 145 corrects the impact position according to the attribute of the player's character or the user (S146).

The present invention has been described based upon illustrative embodiments. These exemplary embodiments are intended to be illustrative only and it will be obvious to those skilled in the art that various modifications to the combination of constituting elements and processes could be developed and that such modifications are also within the scope of the present invention.

What is claimed is:

1. A non-transitory computer-readable medium embedding a game control program, the program comprising:
  an input receiving module operative to receive an input of a user's operation;
  a control module operative to control a game where a player's character plays golf, according to the input of the user's operation; and
  a screen generating module operative to display a screen of the game,
  the control module including:
  an impact determining module operative to acquire a first position of an input device at a start of a shot which sets a center position of a ball and a second position of the input device at a time of an impact, when a user swings the input device while holding the input device, and operative to compare the respective first and second positions with each other so as to determine an impact position representing a position at which the ball is hit by a club head; and
  a ball path calculating module operative to calculate a path of the ball in accordance with the impact position determined by the impact determining module such that the larger a displacement between the impact position and the center position of the ball, the larger another displacement between a calculated landing spot of the ball and a targeted landing spot of the ball.

2. The non-transitory computer-readable medium according to claim 1, wherein the impact determining module acquires the respective first and second positions by analyzing an image of the input device picked up by an image pickup apparatus for taking an image of the input device.

3. The non-transitory computer-readable medium according to claim 2, wherein the impact determining module acquires a distance between the input device and the image pickup apparatus and positional coordinates of the input device in the image by analyzing the image, and
  the impact determining module determines the impact position in such a manner that first positional coordinates of the input device in a first image at the time when the input device returns to a same distance as that between the input device and the image pickup apparatus at the start of the shot are compared with second positional coordinates of the input device in a second image at the start time of the shot.

4. The non-transitory computer-readable medium according to claim 1, wherein the impact determining module corrects the impact position according to an attribute of the player's character or the user.

5. The non-transitory computer-readable medium according to claim 1, wherein the ball path calculating module calculates the path of the ball, by using a sensor value acquired from a sensor module, provided in the input device, operative to detect velocity, acceleration, angular velocity or orientation of the input device.

6. The non-transitory computer-readable medium according to claim 1, the control module further including a power determining module operative to determine a power of the shot in response to a degree of swing-back, wherein, when the user swings back while holding the input device, the power determining module determines the degree of swing-back by acquiring a third position of the input device, and the power determining module displays an indicator indicating an estimated level of the power, when the ball is hit as a result of downswing from a swing-back position, in response to the determined degree of swing-back.

7. A game device comprising:

an input receiving unit configured to receive an input of a user's operation;

a control unit configured to control a game where a player's character plays golf, according to the input of the user's operation; and a screen generating unit configured to display a screen of the game, the control unit including:

an impact determining unit configured to acquire a first position of an input device at a start of a shot which sets a center position of a ball and a second position of the input device at a time of an impact, when a user swings the input device while holding the input device, and configured to compare the respective first and second positions with each other so as to determine an impact position representing a position at which the ball is hit by a club head; and a ball path calculating unit configured to calculate a path of the ball in accordance with the impact position determined by the impact determining unit such that the larger a displacement between the impact position and the center position of the ball, the larger another displacement between a calculated landing spot of the ball and a targeted landing spot of the ball.

8. A game control method comprising:

receiving an input of a user's operation, via an input device;

controlling a game where a player's character plays golf, according to the input of the user's operation, via a computer processor; and displaying a screen of the game, the controlling including:

determining an impact position representing a first position at which a ball is hit by a club head in such a manner that a second position of an input device at a start of a shot sets a center position of a ball and a second position of the input device at the time of an impact, when a user swings the input device while holding the input device, are acquired and the first and second respective first and second positions compared with each other; and calculating a path of the ball in accordance with the impact position determined by the determining such that the larger a displacement between the impact position and the center position of the ball, the larger another displacement between a calculated landing spot of the ball and a targeted landing spot of the ball.

9. The non-transitory computer-readable medium according to claim 2, wherein the impact determining module corrects the impact position according to an attribute of the player's character or the user.

10. The non-transitory computer-readable medium according to claim 3, wherein the impact determining module corrects the impact position according to an attribute of the player's character or the user.

11. The non-transitory computer-readable medium according to claim 2, wherein the ball path calculating module calculates the path of the ball, by using a sensor value acquired from a sensor module, provided in the input device, operative to detect velocity, acceleration, angular velocity or orientation of the input device.

12. The non-transitory computer-readable medium according to claim 3, wherein the ball path calculating module calculates the path of the ball, by using a sensor value acquired from a sensor module, provided in the input device, operative to detect velocity, acceleration, angular velocity or orientation of the input device.

13. The non-transitory computer-readable medium according to claim 4, wherein the ball path calculating module calculates the path of the ball, by using a sensor value acquired from a sensor module, provided in the input device, operative to detect velocity, acceleration, angular velocity or orientation of the input device.

14. The non-transitory computer-readable medium according to claim 2, the control module further including a power determining module operative to determine a power of the shot in response to a degree of swing-back, wherein, when the user swings back while holding the input device, the power determining module determines the degree of swing-back by acquiring a third position of the input the power determining module displays an indicator indicating an estimated level of the power, when the ball is hit as a result of downswing from a swing-back position, in response to the determined degree of swing-back.

15. The non-transitory computer-readable medium according to claim 3, the control module further including a power determining module operative to determine the power of the shot in response to a degree of swing-back, wherein, when the user swings back while holding the input device, the power determining module determines the degree of swing-back by acquiring a third position of the input device during swing-back, and the power determining module displays an indicator indicating an estimated level of the power, when the ball is hit as a result of downswing from a swing-back position, in response to the determined degree of swing-back.

16. The non-transitory computer-readable medium according to claim 4, the control module further including a power determining module operative to determine a power of the shot in response to a degree of swing-back, wherein, when the user swings back while holding the input device, the power determining module determines the degree of swing-back by acquiring a third position of the input device during swing-back, and the power determining module displays an indicator indicating an estimated level of the power, when the ball is hit as a result of downswing from a swing-back position, in response to the determined degree of swing-back.

17. The non-transitory computer-readable medium according to claim 5, the control module further including a power determining module operative to determine a power of the shot in response to a degree of swing-back, wherein, when the user swings back while holding the input device, the power determining module determines the degree of swing-back by acquiring a third position of the input device during swing-back, and the power determining module displays an indicator indicating an estimated level of the power, when the ball is hit as a result of downswing from a swing-back position, in response to the determined degree of swing-back.

\* \* \* \* \*